US010992968B2

(12) United States Patent
Parekh et al.

(10) Patent No.: US 10,992,968 B2
(45) Date of Patent: Apr. 27, 2021

(54) METHOD AND APPARATUS FOR AN ENHANCED DATA PIPELINE

(71) Applicant: AT&T Intellectual Property I, L.P., Atlanta, GA (US)

(72) Inventors: Shyam Parekh, Orinda, CA (US); Mostafa Tofighbakhsh, Cupertino, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/511,654

(22) Filed: Jul. 15, 2019

(65) Prior Publication Data

US 2021/0021883 A1    Jan. 21, 2021

(51) Int. Cl.
| | |
|---|---|
| H04L 29/06 | (2006.01) |
| G06N 3/08 | (2006.01) |
| H04N 21/237 | (2011.01) |
| H04N 21/235 | (2011.01) |
| H04N 21/234 | (2011.01) |
| G06K 9/62 | (2006.01) |

(52) U.S. Cl.
CPC ..... *H04N 21/23418* (2013.01); *G06K 9/6256* (2013.01); *G06N 3/08* (2013.01); *H04L 69/22* (2013.01); *H04N 21/237* (2013.01); *H04N 21/2353* (2013.01)

(58) Field of Classification Search
CPC .......... H04N 21/23418; H04N 21/237; H04N 21/2353; H04L 69/22; H04L 45/08; H04L 49/1546; H04L 45/566; H04L 67/327; G06K 9/6256; G06N 3/08; H04J 14/0269
See application file for complete search history.

(56) References Cited

U.S. PATENT DOCUMENTS

| | | | | |
|---|---|---|---|---|
| 10,360,482 | B1* | 7/2019 | Khare | G06K 9/6227 |
| 2015/0200802 | A1* | 7/2015 | Sawal | H04L 45/22 370/228 |
| 2017/0171076 | A1* | 6/2017 | Nguyen | H04L 45/60 |
| 2018/0020247 | A1* | 1/2018 | Zhang | G06Q 30/0241 |
| 2019/0199628 | A1* | 6/2019 | Amin | H04L 69/22 |
| 2019/0222672 | A1* | 7/2019 | Greenberg | H04L 41/145 |
| 2020/0053190 | A1* | 2/2020 | Uddin | H04L 67/16 |

* cited by examiner

*Primary Examiner* — Robert J Hance
*Assistant Examiner* — Tien M Nguyen
(74) *Attorney, Agent, or Firm* — Guntin & Gust, PLC; Kenneth Kwan

(57) ABSTRACT

Aspects of the subject disclosure may include, for example, performing steps including monitoring a plurality of data packets in a data pipeline of a network, such as a User Plane Function of a 5G Core, where the monitoring can include analyzing header information associated with the plurality of data packets, identifying a first data object in the plurality of data packets according to the monitoring of the plurality of data packets, where the identifying the first data object in the plurality of data packets can further comprise identifying metadata associated with the first data object, switching a first set of data packets of the plurality of data packets associated with the first data object to an intelligent router for extracting the first data object from the first set of data packets to generate an extracted first data object responsive to the identifying the first data object in the plurality of data packets, and transmitting the extracted first data object to a client device via the data pipeline of the network. Other embodiments are disclosed.

20 Claims, 9 Drawing Sheets

300

METHOD AND APPARATUS FOR AN ENHANCED DATA PIPELINE

FIELD OF THE DISCLOSURE

The subject disclosure relates to a method and apparatus for media data pipeline.

BACKGROUND

Modern telecommunications systems provide consumers with telephony capabilities while accessing a large variety of content. Consumers are no longer bound to specific locations when communicating with others or when enjoying multimedia content or accessing the varied resources available via the Internet. Network capabilities have expanded and have created additional interconnections and new opportunities for using mobile communication devices in a variety of situations. Intelligent devices offer new means for experiencing network interactions in ways that anticipate consumer desires and provide solutions to problems.

BRIEF DESCRIPTION OF THE DRAWINGS

Reference will now be made to the accompanying drawings, which are not necessarily drawn to scale, and wherein.

DETAILED DESCRIPTION

Figure 1:
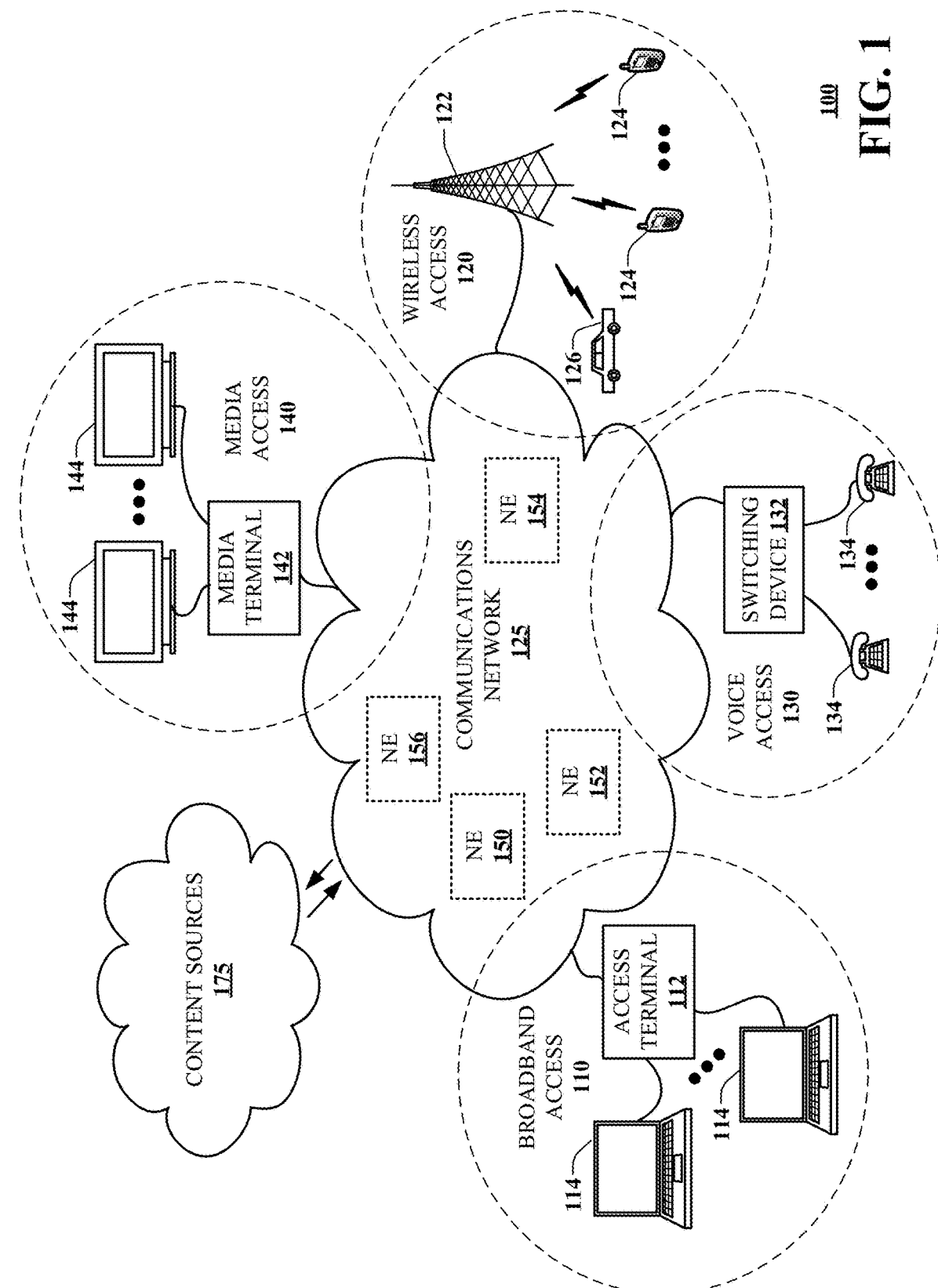
FIG. 1 is a block diagram illustrating an exemplary, non-limiting embodiment of a communications network in accordance with various aspects described herein.

The subject disclosure describes, among other things, illustrative embodiments for processing data in a data pipeline. In one or more embodiments, a system can monitor a data pipeline to identify data objects in data packets carried by the data pipeline. The system can instantiate intelligent routers at the data pipeline, including services such as solid-state memory devices, graphical processing units, and/or packet monitor functions. The system can switch data packets associated with the data objects to the intelligent routers, where the data objects are extracted from the data packets and stored in cache memory. Upon receiving requests from client devices, the intelligent routers can transmit the extracted data objects from the cache memory to the client devices. The intelligent routers can, in turn, be decommissioned subsequent to transmission of the extracted data objects.

One or more aspects of the subject disclosure include a device, including a processing system including a processor, and a memory that stores executable instructions that, when executed by the processing system, facilitate performance of operations. The operations can include monitoring a plurality of data packets in a data pipeline of a network and, in turn, identifying a first data object in the plurality of data packets according to the monitoring of the plurality of data packets, where the monitoring can include analyzing header information associated with the plurality of data packets. The operations can also include instantiating an intelligent router at the data pipeline of the network responsive to the identifying the first data object, where the intelligent router can include a solid-state memory device, a graphical processing unit, and packet monitoring functions. The operations can further include switching a first set of data packets of the plurality of data packets associated with the first data object to the intelligent router for extracting the first data object from the first set of data packets to generate an extracted first data object responsive to the identifying the first data object in the plurality of data packets. Operation of the intelligent router can be directed according to extended tables associated with a domain-specific programming language. For example, the P4 programming language is specific to the domain of routing and the control of routing operations. The operations can include receiving a request from a client device for the first data object and, in turn, transmitting the extracted first data object to the client device via the data pipeline of the network responsive to the request for the first data object. The operations can also include decommissioning the intelligent router responsive to the transmitting the extracted first data object.

One or more aspects of the subject disclosure include a machine-readable medium, comprising executable instructions that, when executed by a processing system including a processor, facilitate performance of operations. The operations can include monitoring a plurality of data packets in a data pipeline of a network and identifying a first data object in the plurality of data packets according to the monitoring of the plurality of data packets. The identifying the first data object in the plurality of data packets can further comprise identifying metadata associated with the first data object. The monitoring can include analyzing header information associated with the plurality of data packets. The operations can also include instantiating an intelligent router at the data pipeline of the network responsive to the identifying the first data object. The operations can further include switching a first set of data packets of the plurality of data packets associated with the first data object to the intelligent router for extracting the first data object from the first set of data packets to generate an extracted first data object responsive to the identifying the first data object in the plurality of data packets. The operations can include transmitting the extracted first data object to a client device via the data pipeline of the network.

One or more aspects of the subject disclosure include a method, performing, by a processing system including a processor, steps including monitoring a plurality of data packets in a data pipeline of a network, where the monitoring can include analyzing header information associated with the plurality of data packets. The method can include identifying a first data object in the plurality of data packets according to the monitoring of the plurality of data packets, where the identifying the first data object in the plurality of data packets can further comprise identifying metadata associated with the first data object. The method can also include switching a first set of data packets of the plurality of data packets associated with the first data object to an intelligent router for extracting the first data object from the first set of data packets to generate an extracted first data object responsive to the identifying the first data object in the plurality of data packets. The method can further include transmitting the extracted first data object to a client device via the data pipeline of the network.

Referring now to FIG. 1, a block diagram is shown illustrating an example, non-limiting embodiment of a communications network 100 in accordance with various aspects described herein. For example, communications network 100 can facilitate in whole or in part processing data in a data pipeline. A system can monitor a data pipeline to identify data objects in data packets carried by the data pipeline. The system can instantiate intelligent routers at the data pipeline, including services such as solid-state memory devices, graphical processing units, and/or a packet monitoring functions. The system can switch data packets associated with the data objects to the intelligent routers, where the data objects are extracted from the data packets and stored in cache memory. Upon receiving requests from client devices, the intelligent routers can transmit the extracted data objects from the cache memory to the client devices. The intelligent routers can, in turn, be decommissioned subsequent to transmission of the extracted data objects.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
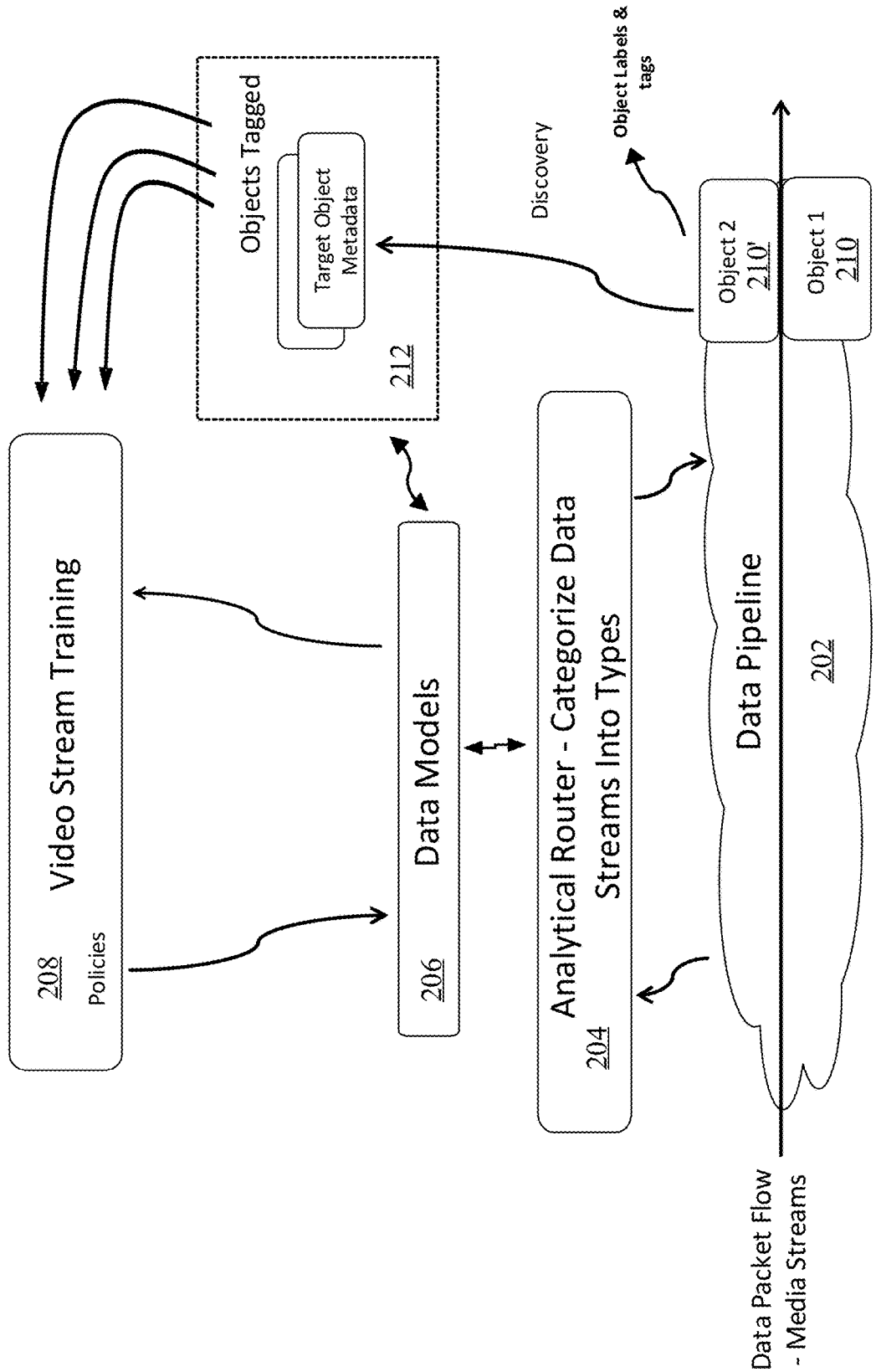
FIG. 2A-2C is a block diagram illustrating an example, non-limiting embodiment of a system functioning within the communication network of FIG. 1 in accordance with various aspects described herein.
Figure 2B:
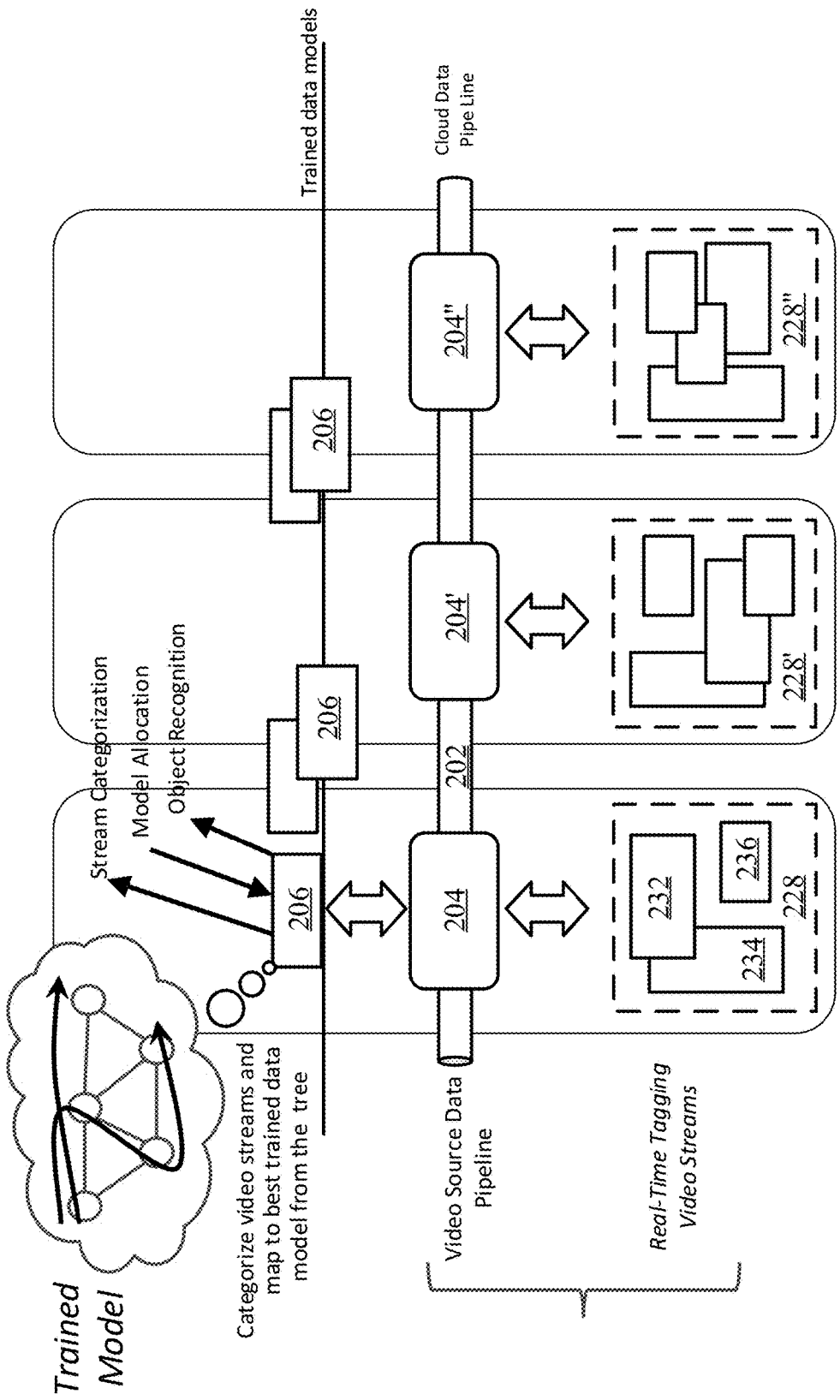
Figure 2C:
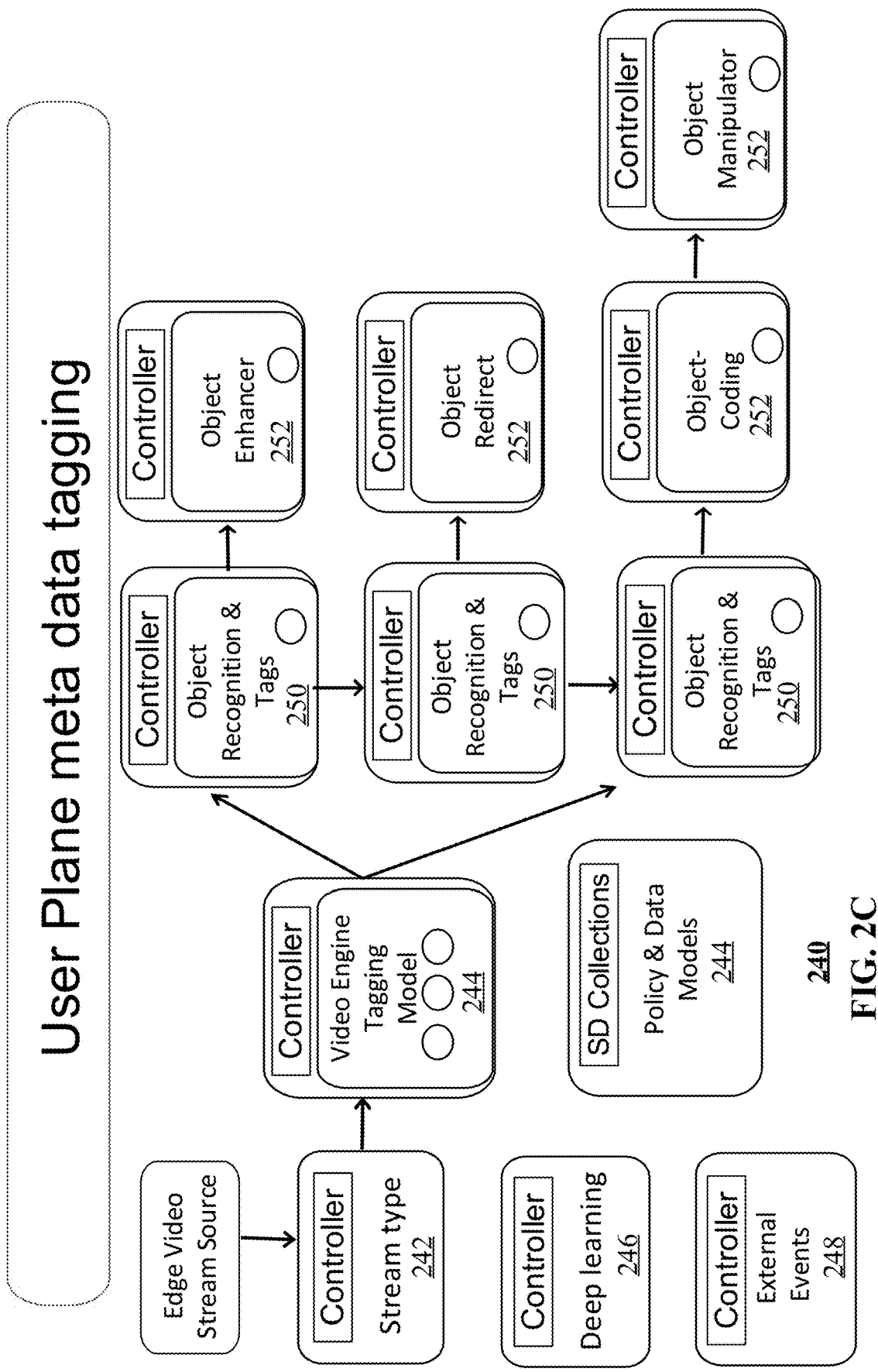

FIGS. 2A-2C is a block diagram illustrating an example, non-limiting embodiment of a system functioning within the communication network of FIG. 1 in accordance with various aspects described herein. FIG. 2A depicts an illustrative embodiment of a system 200 for facilitating, in whole or in part, processing data in a data pipeline. A system can monitor a data pipeline to identify data objects in data packets carried by the data pipeline. The system can instantiate intelligent routers at the data pipeline, including services such as solid-state memory devices, graphical processing units, and/or a packet monitoring functions. The system can switch data packets associated with the data objects to the intelligent routers, where the data objects are extracted from the data packets and stored in cache memory. Upon receiving requests from client devices and/or other devices and/or network elements, the intelligent routers can transmit the extracted data objects from the cache memory to the client devices. The intelligent routers can, in turn, be decommissioned subsequent to transmission of the extracted data objects.

In one or more embodiments, the system 200 can include a data pipeline 202. The data pipeline 202 can include routers for transmitting data packets. The data pipeline 202 can also include transmission media, such as fiber optic lines and/or copper wire. In one or more embodiments, the data pipeline 202 can further include an analytical router 204. The analytical router 204 can process packet data streams in the data pipeline in real-time. In particular, analytical router 204 can analyze headers from data packets to identify data objects 210 and 210' that are associated with the data packets flowing in the data pipeline 202. For example, the analytical router 204 can monitor data packets flowing in the data pipeline 202 to determine if those data packets are part of a data object 210, such as a video stream. In one or more embodiments, the analytical router 204 can analyze header information from the data packets. The analytical router 204 can determine if the header information indicates that the data packets are associated with a particular type of data object 210. For example, header information, such as metadata, title data, data type information, can be gleaned from the data packet header, and can be associated with one or more types of data objects 210.

In one or more embodiments, the data pipeline 202 may be a User Plane Function (UPF) included as a part of a 5G Core infrastructure architecture. The UPF may implement a Control and User Plane Separation (CUPS) strategy, where Control Plane (CP) and User Plane (UP) functions are decoupled, such that functions associated with data forwarding are decentralized from CP functions. As a result, packet processing and traffic aggregation may be performed in close proximity to a network edge. By moving the functions of the data pipeline 202 close to the network edge, the UPF can increase bandwidth efficiencies.

In one or more embodiments, the analytical router 204 can access data models 206 that associate various types and/or sequences of header data information with various types of data objects, such as video streams. The analytical router 204 can compare the header data information acquired from data packets it has sampled from the data pipeline with header data from the data models 206. If the analytical router 204 matches or nearly matches the data model header information and the data packet header information, then the analytical router 204 can conclude that the sampled data packets from the data pipeline 202 are associated with a particular type of data object 210.

In one or more embodiments, the data models 206 can be generated via a video stream training function 208. As header information of packet data is analyzed, target object metadata of the header information and particular objects 210 can be mutually associated and logged as tagged objects in a database 212. The video stream training function 208 can use the mutual association between metadata in the header information and data objects 210 to train the data models 206 that are used by the analytical router 204 for identifying new data objects in real-time.

FIG. 2B further depicts an illustrative embodiment of a system 220 for facilitating, in whole or in part, processing data in a data pipeline. In one or more embodiments, the system 220 can perform real-time tagging of data objects in the data packets of the data pipeline 202. In one embodiment, a series of analytical routers 204, 204', and 204" can analyze packet data at the data pipeline 202. The analytical router 204 can use the trained data models 206 to determine if the data packets at the data pipeline 204 are associated data objects. The data packets are thereby tagged as belonging to data objects, such as video objects.

In one or more embodiments, upon determining, based on header information, that a group of data packets in the data pipeline 202 is carrying payload data associated with a data object, the analytic router 204 can direct the data packets to an intelligent router 228, 228', or 228". The intelligent router 228 can include one or more higher level devices for processing the data packets at the data object level. For example, the intelligent router 228 can include a packet monitoring device 232 for extracting data object data from the data packet streams, a solid-state memory device 234 for storing data object data, and/or a graphical processing unit 236 for performing graphical and/or mathematical functions, such as image pattern recognition, on the data object data. In one or more embodiments, the generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

In one or more embodiments, once the analytical router 204 identifies the data packets that include data object data, the intelligent router 228 can extract the data object information from the data packets, so that the system 220 can perform further processing and/or transmission of the information at the data object level. A significant amount of data pipeline resources—bandwidth, capacity, quality of service—can be freed up from processing massive data objects, such as video streams, while intelligent routers 228, 228', and 228" perform processing and re-transmission with high efficiency. FIG. 2C further depicts an illustrative embodiment of a system 240 for facilitating, in whole or in part, processing data in a data pipeline. In particular, the system 240 can dynamically allocate resources for processing intensive activities of recognizing data objects and tags and enhancing/redirecting/coding/manipulating data objects that have been recognized. The system 240 utilizes controllers 242, 244, 246, 248 for providing a tagging model, policies, learning, and triggering on external events. These front end controllers can be of a relatively static set of resources for use by the system 240 providing pipelining services. By comparison, the backend controllers 250 and 252 for providing enhancing/redirecting/coding/manipulating of data objects that have been identified by the system 240 can be relatively dynamically added/subtracted by processes of instantiation, initiation, and/or decommissioning of virtual network functions as processing needs and quality of service demands change over time.

In one or more embodiments, long-term increases in data traffic and increases network demand have been found to keep service providers of internet and communication data pipelining busy with network centric & packet forwarding pipeline activities. By comparison, over-the-top (OTT) services, such as web-based streaming services, like those provided by Google™, Netflix™, Apple™, and Facebook™ have leveraged application services and cloud computing businesses utilizing centralized cloud solutions by adding intelligence beyond simple routing of data packets at computing layers. In addition, 5G application demands can force service providers to move toward smarter forwarding pipeline that goes beyond traditional pipelining layers 1-4. In one or more embodiments, the system 220 provides a multi-Layer network delivery system that combines a basic forwarding pipeline 202 with data object specific intelligent routers 228 operating at hardware speeds. The data object capabilities of the system 220 can provide a service provider with enhanced delivery speeds and data object focus that can allow the service provider to move "up the stack" into the application level while still providing lower level data pipeline services.

In one or more embodiments, a system 220, based on intelligent routers, can provide a multi-level layer environment that can effectively bypass and/or significantly limit the usage of software stacks. Intelligent router 228 can include functions, such as but not limited to, integrated GPU (Graphic Processing Unit) 236, DPU (Date Processing Unit) 232, memory/queuing at a SSD (Solid-State Drive) 234. These functions of the intelligent router 228 can be efficiently performed at very high hardware speed. In addition, the intelligent router 228 can include a wide range of programmability options consistent with media cruiser forwarding & analytics pipelines in a multi-level layer.

In one or more embodiments, a video stream, such as a soccer game, can be detected by the analytical router 204. The analytical router 204 can identify the objects of the game (ball, players, field, etc.,) in the data packets. The analytical router 204 can capture metadata related to the game from headers of the data packets. The analytical router 204 can simply cache this metadata and can stream this metadata instead of streaming the entire set of data packets. The data packets can be captured by the intelligent router 228, which can use its processing resources 232-236 to process the data packets at the data object level. The result is an object-switching pipeline 202. The object-switching pipeline 202, can be more efficient than a packet-switching pipeline. The ability to switch at higher level primitives, such as data objects, metadata, and/or video clips can result in better utilization of wireless communication spectrums, network bandwidth, memory, storage, and/or related resources. The additional computing devices and nodes for the intelligent routers 228 can be integrated into network resources. Object-level switching can enable the lower layers (L1-L4) of an OSI network model to be collapsed into intelligent router 228 sub-appliances, such as DPI devices 232, SSD memory devices 234, and/or GPU devices 236.

In one or more embodiments, the system 220 can utilized protocols, such as RDMA (Remote Direct Memory Access) or enhanced-versions of RDMA, to work across wide area networks with capability to extract data objects at the boundaries of these data objects (e.g., files, Meta data, and/or video). By using extensively-integrated appliances, such as DPI 232, SSD memory 234, and GPU 236, at the intelligent routers 228, all of the needed object-level processing can be automated and centralized. This concentration of resources can be leveraged to offer personalization of services and to gain maximum efficiency for the service provider networks while eliminating or reducing the need for the operating system (OS) and other, related, traditional memory stacks.

In one or more embodiments, a switching "fabric" of traditional routers can be overlaid with intelligent routers 228, including for DPI 232, SSD memory 234, and/or GPU 236. These intelligent routers 228 can be partitioned into independent resource functions available as a pool to the network. As a result, networking and service resources management schedules can be coordinated using high-level event queues.

In one or more embodiments, the analytical router 204 can capture a set of data packets and can use a DPI function, such as the DPI 232 of the intelligent router 228, to determine the general type of content that is being carried by the data packers. The analytical router 204 can identify and categorize the type of the data object (if such a data object exists). For example, the analytical router 204 can determine if the payloads of the data packets contain information related to a picture, a video, and/or metadata. Once the analytical router 204 has determined the type of data object, that analytical router 204 and/or the intelligent router 228 can decide how to process the data packets, via the intelligent router 228, in order to efficiently extract the data object.

In one or more embodiments, the object-level pipeline 202 provides integration of a spine and leaf programmable switching fabric with shared intelligent router 228 appliances. The object-level pipeline 202 enables the service provider network to take control of containerized (object level) functions, which are compatible with edge and core cloud-centric platforms. The object-level pipeline 202 can take advantages of shared intelligent router 228 appliances that are attached to the switching fabric, via the domain-specific programming language, such as the P4 language, where the domain-specific programming includes a collection of specific processing flows for the intelligent routers based on a data modeling signatures for the specific data objects. In one or more embodiments, the switching fabric can utilize the attached intelligent router 228 appliances, such as DPI 232, SSD memory 234, and/or GPU 236, to characterize metadata and/or data objects. The switching fabric can utilizes the domain-specific programming language, such as the P4 language or a "P4-like" programming language, to perform "look up" operations and/or access "look up" tables, which can be used to instantiate and/or spin off network and service functions in an adaptive fashion. The look up tables can be based on categorizations signatures, such as data objects or metadata. As a result, the object-level pipeline 202 can provide enhanced computing, data storage, and/or address space capabilities. These enhanced capabilities can potentially eliminate and/or reduce the need for data packet switching while enabling object-level and/or metadata-level switching.

For example, a group of data packet streams can represent a video clip, an image of a person, and/or some other intelligent value. The object-level pipelines 202 can carry groups of data packets that can represent one or more intelligent events. The inclusion of intelligent routers in the object-level pipelines can significantly improve data latency and network utilization, while the control of service functions can be pushed down to the service provider networks. The extension and application of the domain-specific programming language to control of the analytical routers 204 and the intelligent routers 228 can enable the identification of data object targets and the use of plug-ins that can allow the object-level pipeline to perform faster, more efficiently, and/or more intelligently, while reducing network utilization by use of coding techniques. In one or more embodiments, the system 220 does not need to send an entire video stream of data packets to a client device. Rather, the system 220 can utilized the additional processing power of the intelligent routers 228 at the switch fabric level to efficiently process the packet data and to transmit the content at an object-level and/or metadata-level.

In one or more embodiments, a system 220 of combined object-level data pipelines can use domain-specific programmability to control intelligent router 228 appliances, including DPI, SSD memory, and/or GPU. Data packet flows can enter the system 220, can be categorized into metadata and/or data objects via or modeling signatures for the object types. Network-level services can be set off from the categorized collection of packet flows and can form a data object and/or a metadata object. In one or more embodiments, data packets can be processed into data objects, which are subsequently tagged for object-level switching by deeper networking switches or cached for load and optimization. In one or more embodiments, the system is able to spin up containers associated with the data-object and/or metadata according to the categories, or types, of objects, which will be used for object-level switching. In another embodiment, machine-learning (ML) algorithms can be used to perform knowledge-based, object-level switching based on one or more factors, including external events and pipeline-accessible metadata.

In one or more embodiments, the system 220 can use programmable (or advanced programmable) extension tables. The extension tables can be designed to embrace integrated switching with DPI 232, SSD memory 234, and/or GPUs, where the programmability enables the intelligent router 228 to operate at hardware speeds, yet with extremely flexible programmability. For example, a table descriptor can be used to provide multi-layer instructions to each respective hardware component 232 in the intelligent router 228. The extension tables can function as "DNA" instructions for configuring and controlling the hardware components 232 processing any layer of the data object at hardware speeds for both the intelligent router 228 and for other switches and routers. The "DNA" Instructions can describe actions to be performed by the various hardware in the various scenarios. In various examples, the table instructions can direct switches to perform switching function based on IP layers. The table instructions can direct SSD memories 234 can perform storage functions, including advantageous hardware acceleration features, in support of Quality-of-Service (QoS), traffic management, and/or delivery diversity. The memory instructions can be used to perform data queue management and/or "glue logic" to minimize the data copying and/or the number of copies of data across the various hardware components of the intelligent router 228. The table instructions can direct DPUs 232 apply packet monitoring to one or more data packets. The table instructions can direct GPUs 236 to perform graphical computation and/or parallel graphical computational processing. In one or more embodiments, the domain-specific language, which can be used for packet-level switching, can further be extended to direct operations for inspecting payloads, controlling memories, and/or overseeing graphical functions. In one embodiment, data packets can be subject to encryption. In such a case, the system 220 can use machine learning to identify patterns and/or signatures that can be used by the system 220 to overcome the encryption.

In one example, the table extensions can include instructions, such as switch control, which can match information in one or more headers of data packets. The header information can perform actions for forwarding pipeline data to one or more logical ports, including SSD memory 234, GPU 236, and/or DPU 232 hardware functions. The functions at the intelligent routers can be used to process payloads of data packets (as opposed to dumbly forwarding the data packets). The functions can be used to match logical addresses and/or to copy data from a logical port into an addressable memory. The memory pointers can be used as references by other components. The functions at the intelligent routers 228 can be used at the SSD 234 to compare and/or match specific SSD features or actions, such as storing, organizing, scheduling deliveries, and/or categorizing data and/or objects.

The functions at the intelligent routers 228 can be used to direct a GPU 236 to perform graphical functions. The functions at the intelligent routers 228 can be used to direct the DPU to perform packet monitoring of one or more data packets in order to compare and/or match data, including categorization of metadata and/or tagging. Intelligent router equipment and functions are described in Table 1, below:

TABLE 1

Intelligent Router equipment and functions.

| Switch Forwarding pipeline | Match/action (forwarding) |
| SSD store and compute pipeline | Match/Action (compute and delivery) |
| GPU compute instruction pipeline | Mach/Action (Compute and . . .) |
| DPI; instruction pipeline | Mach/Action (shift into payload and action) |

In one or more embodiments, a packet data source at the pipeline 202 can trigger different types of application containers based on different types of data objects, metadata, and/or flow signatures detected by the analytical router 204 at the pipeline 202. In one example, the domain-specific programming language instructions can direct the system 202 to categorize the data packets and/or automatically process pre-labeled packets into objects. In this example, the data objects can be handled according to level policies and/according to policy definitions. This architecture can enable shared platforms at a network edge to meet standards for application performance, latency, scaling, optimization, user data privacy and/or security.

In one or more embodiments, edge functionality can be implemented to exploit new technology trends and/or enhance opportunities beyond simple "dumb" pipes. In one example, applications executing at user equipment (UE) and/or internet-of-things (IOT) devices can utilizes edge functions by using network protocols, such RDMA or simple rest APIs. Service providers can complement intelligent routers 228 by adding applications, such as intelligent street light gateways to create a data-driven transportation solution.

In one or more embodiments, the system 220 can facilitate mesh-forming data collectors that can enable dynamic configuration of instructions that can match instruction "DNA" sets. These "DNA" instruction sets can be received by the system 220 every period from a Software Defined Collector controller. In one or more embodiments, a ML-centric approach can be used to establish programmable "super tables," which can be used for multi-layer networking. Ambient, or background, computing at the intelligent routers 228 can facilitate applications, which incorporate ML and/or other forms of artificial intelligence (AI). The ML can be characterized by features for human-like cognitive, behavioral capabilities, and/or contextual awareness. A digital environment can be created, in which companies can integrate technology seamlessly and/or invisibly into a large variety of devices to maximize usefulness while minimizing demands for attention or maintenance.

In one or more embodiments, the system 220 can support a number of use cases. For example, the intelligent router 228 can include an inline DPU pipeline with a P4-based instruction wrapper. The intelligent router 228 can also include Inline object switching pipeline with a P4 wrapper, inline ML inference pipeline with an AI wrapper, and an inline Codec pipeline with IP security (IPSEC)/Secure Sockets Layer (SSL) and a P4 wrapper. The intelligent router 228 can also include P4 Interrupt/VProbe observability with a P4 wrapper and/or P4 Video/Voice/IOT Compression with a P4 Wrapper. In this example, an extension "super" table can be used to establish flow categorization of flows. The intelligent router 228 can perform operations for dynamically spinning-off or instantiating multilayer hardware level functions. The hardware level functions can be dynamically provided on per service and/or per flow basis. The intelligent router can perform operations for re-programming the extended tables, for association extended tables to specific probes and/or compute functions, for accessing a "DNA" data model, key matrices and/or data probes, for controlling delivery mechanisms, for performing operations for computing, ML, aggregation of object data, and/or generating entities.

Figure 2D:
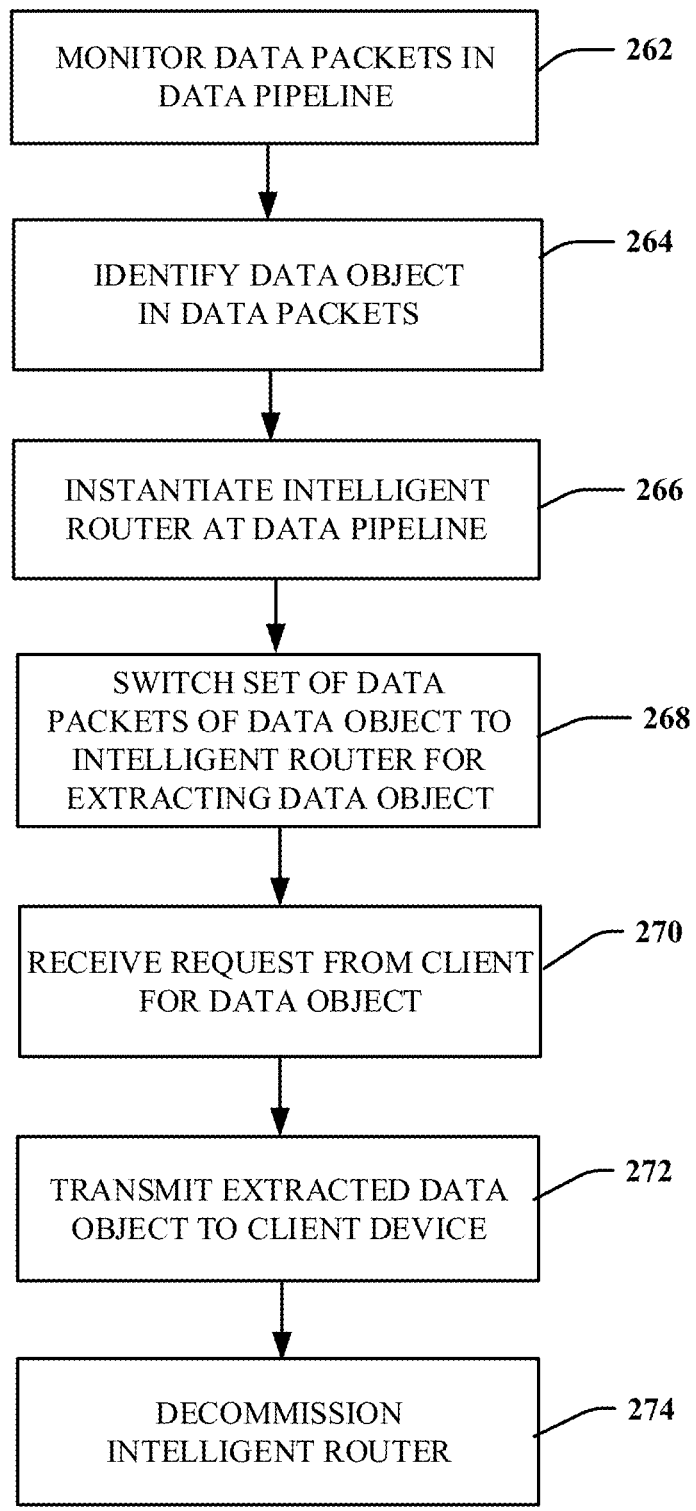
FIG. 2D depicts an illustrative embodiment of a method in accordance with various aspects described herein.

FIG. 2D depicts an illustrative embodiment of a method 260 in accordance with various aspects described herein. A system 220 can monitor data packets in a data pipeline, in step 262. In step 264, the system 220 can identify data objects in the data packets. For example, the system 220 can analyze header information from data packets to detect indicators for a type of data object, such a metadata. In step 266, the analytic router 204 can instantiate an intelligent router 228 at the data pipeline and switch the set of data packets identified to the data object to the intelligent router 228 for processing. If the intelligent router 228 is already extant at the data pipeline, then the system 220 can simply direct the set of data packets to the intelligent router 228. In step 268, the intelligent router 228 can extract the data object from the set of data packets.

In step 270, the system 220 can receive a request from a client device for a data object. The system 220 can respond to the request by transmitting the extracted data object to the client device, in step 272. In step 274, the system 220 can decommission the intelligent router 228 at the conclusion of the extraction and/or transmission of the extracted data object.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
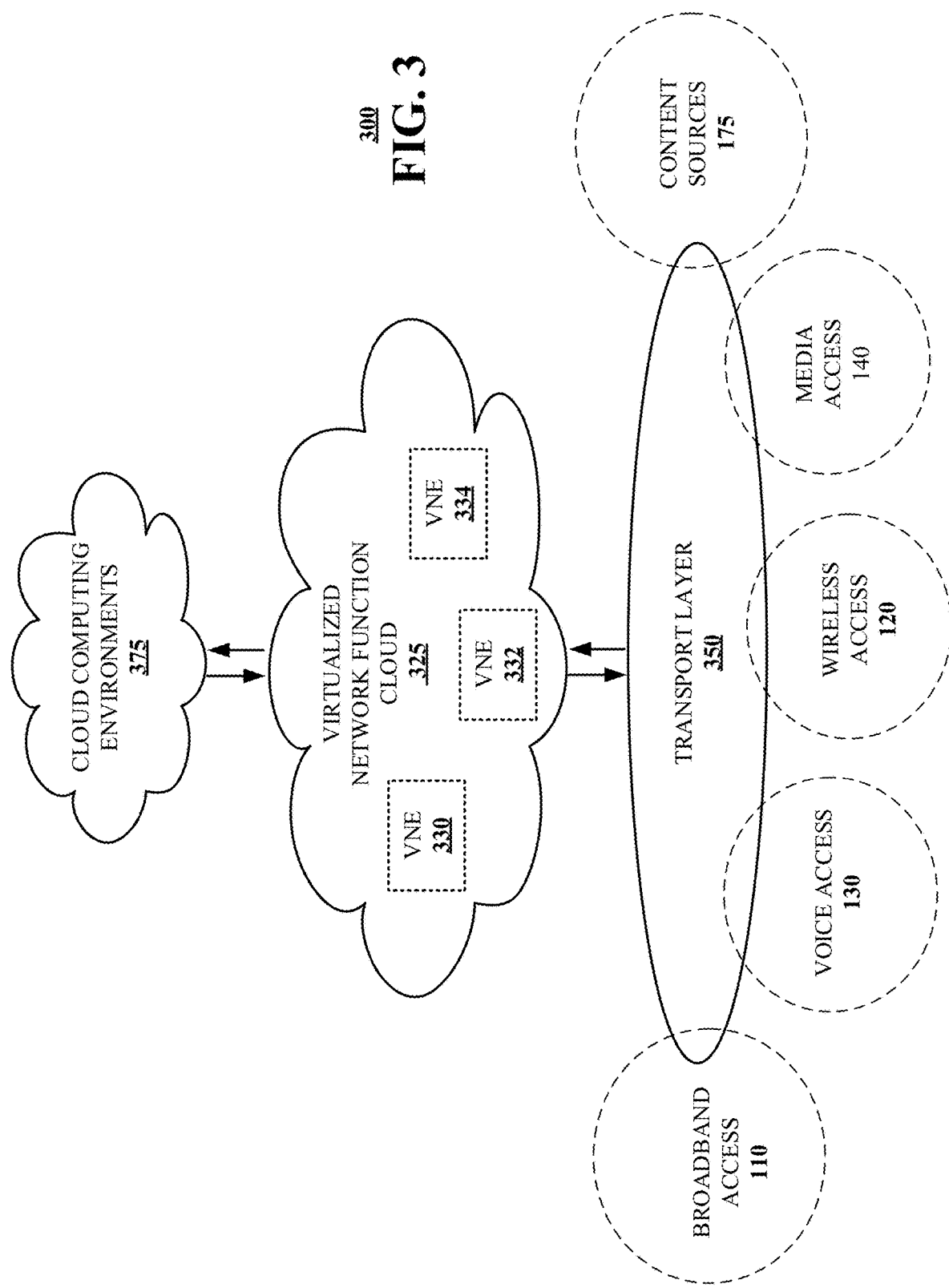
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and method 260 presented in FIGS. 1, 2A-2D, and 3. For example, communications network 100 can facilitate in whole or in part processing data in a data pipeline. A system can monitor a data pipeline to identify data objects in data packets carried by the data pipeline. The system can instantiate intelligent routers at the data pipeline, including services such as solid-state memory devices, graphical processing units, and/or a packet monitoring functions. The system can switch data packets associated with the data objects to the intelligent routers, where the data objects are extracted from the data packets and stored in cache memory. Upon receiving requests from client devices, the intelligent routers can transmit the extracted data objects from the cache memory to the client devices. The intelligent routers can, in turn, be decommissioned subsequent to transmission of the extracted data objects.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
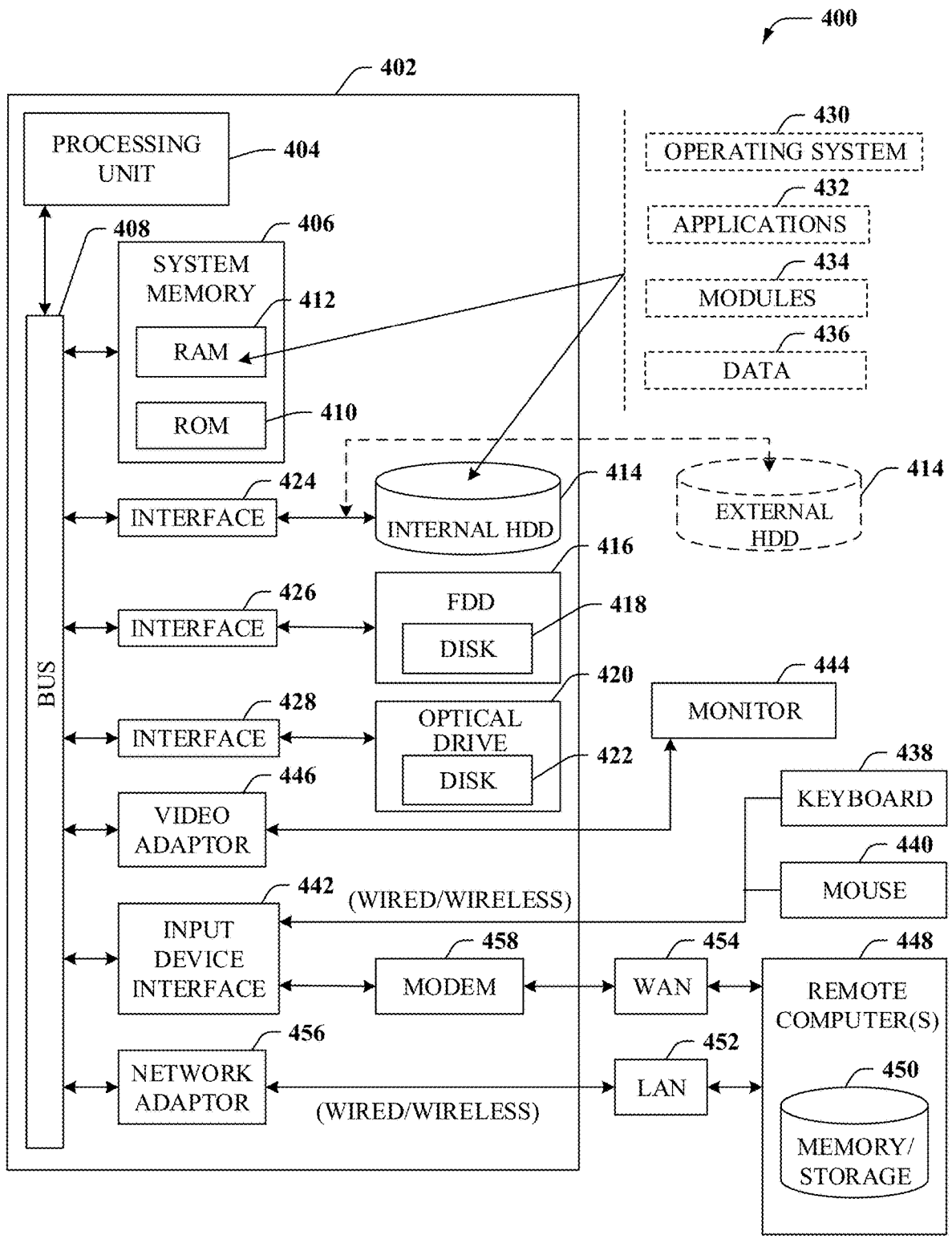
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, communications network 100 can facilitate in whole or in part processing data in a data pipeline. A system can monitor a data pipeline to identify data objects in data packets carried by the data pipeline. The system can instantiate intelligent routers at the data pipeline, including services such as solid-state memory devices, graphical processing units, and/or a packet monitoring functions. The system can switch data packets associated with the data objects to the intelligent routers, where the data objects are extracted from the data packets and stored in cache memory. Upon receiving requests from client devices, the intelligent routers can transmit the extracted data objects from the cache memory to the client devices. The intelligent routers can, in turn, be decommissioned subsequent to transmission of the extracted data objects.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.,) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
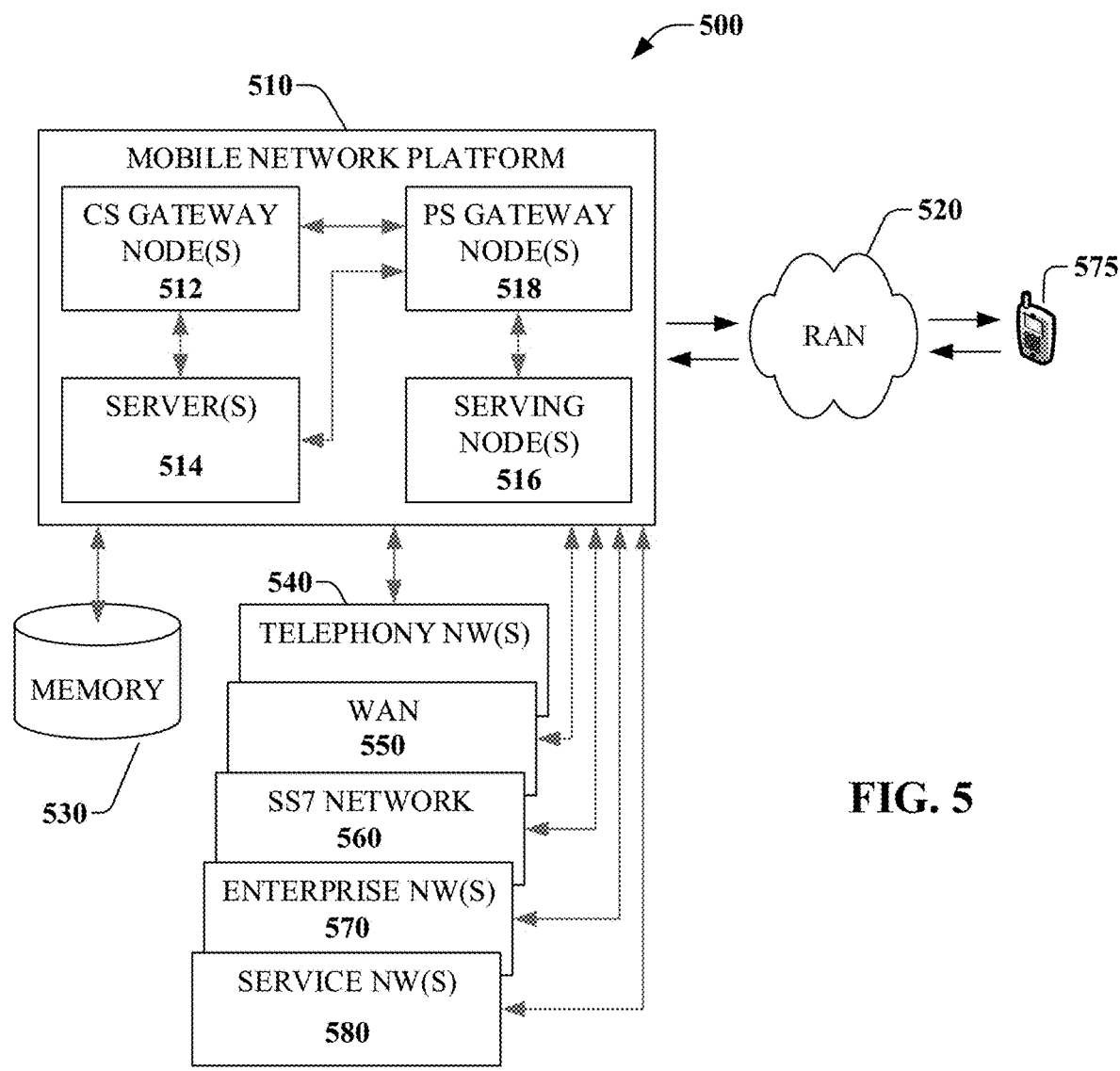
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, processing data in a data pipeline. A system can monitor a data pipeline to identify data objects in data packets carried by the data pipeline. The system can instantiate intelligent routers at the data pipeline, including services such as solid-state memory devices, graphical processing units, and/or a packet monitoring functions. The system can switch data packets associated with the data objects to the intelligent routers, where the data objects are extracted from the data packets and stored in cache memory. Upon receiving requests from client devices, the intelligent routers can transmit the extracted data objects from the cache memory to the client devices. The intelligent routers can, in turn, be decommissioned subsequent to transmission of the extracted data objects.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

The embodiment 500 may support and/or operate according to a 5G system (5GS). A 5GS can include Next Generation (NG) functions, such as a NG-RAN and a NG-CORE. For example, the NG-RAN may consists of gNBs, also known as New Radio (NR) base stations, and/or NG-eNBs. The NG-eNBs may include LTE base stations capable of supporting a 5G Core Network. The NG-RAN may be capable of supporting network slicing and/or aspects related to QoS flow management and/or mapping to radio bearers. The NG-CORE may provide capabilities for full separation between the Control Plane (CP) and the User Plane (UP).

For example, a Session Management Function (SMF) may include session management functions and/or UE IP Address function, which may be provided in an LTE system via MME and/or PGW functions. An Access and Mobility Management Function (AMF) may include mobility management and network access functions, registration functions, and/or security functions. A User Plane Function (UPF) may include network functions performing purely packet processing and transmission operations for the data plane. The NG-RAN and NG-CORE can interface via an NG interface. The NG interface may be either of two versions, NG-C or NG-U, which may be connected to the AMF and the UPF.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
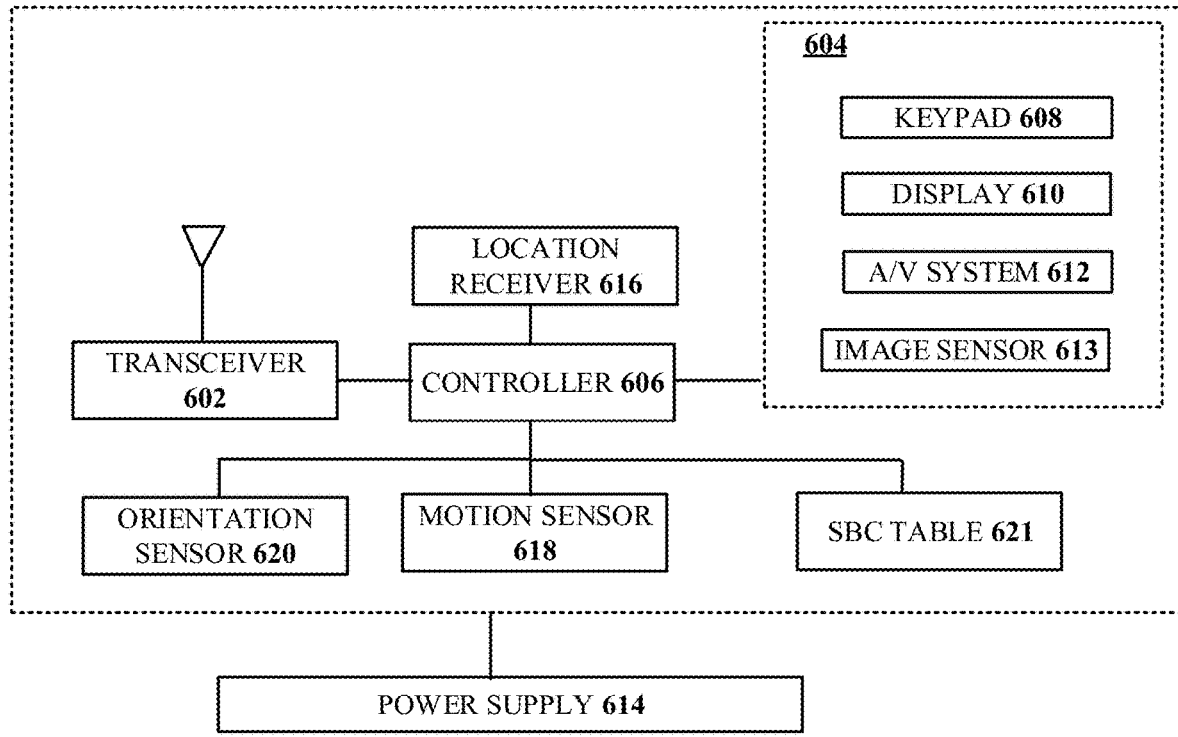
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate, in whole or in part, equipment for processing data in a data pipeline. A system can monitor a data pipeline to identify data objects in data packets carried by the data pipeline. The system can instantiate intelligent routers at the data pipeline, including services such as solid-state memory devices, graphical processing units, and/or a packet monitoring functions. The system can switch data packets associated with the data objects to the intelligent routers, where the data objects are extracted from the data packets and stored in cache memory. Upon receiving requests from client devices, the intelligent routers can transmit the extracted data objects from the cache memory to the client devices. The intelligent routers can, in turn, be decommissioned subsequent to transmission of the extracted data objects.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
monitoring a plurality of data packets in a data pipeline of a network, wherein the monitoring includes analyzing header information associated with the plurality of data packets to detect one or more indicators associated with a first data object type;
identifying a first data object in the plurality of data packets according to the monitoring of the plurality of data packets and according to a model relating to the first data object type, wherein the model is trained based on associations between data objects of the first data object type and analyzed header information associated with other data packets;
instantiating an intelligent router at the data pipeline of the network responsive to the identifying the first data object, wherein the intelligent router includes a solid-state memory device, a graphical processing unit, and a packet monitoring function;
switching a first set of data packets of the plurality of data packets associated with the first data object to the intelligent router for extracting the first data object from the first set of data packets to generate an extracted first data object responsive to the identifying the first data object in the plurality of data packets, wherein operation of the intelligent router is directed according to extended tables associated with a domain-specific programming language;
receiving a request from a client device for the first data object;
transmitting the extracted first data object to the client device via the data pipeline of the network responsive to the request for the first data object; and
decommissioning the intelligent router responsive to the transmitting the extracted first data object.

2. The device of claim 1, wherein the monitoring the plurality of data packets includes sampling one or more data packets of the plurality of data packets, wherein the one or more indicators associated with the first data object type include metadata, and wherein the identifying the first data object in the plurality of data packets further comprises identifying, in header information associated with the one or more data packets of the plurality of data packets, metadata associated with the first data object type.

3. The device of claim 1, wherein the model relating to the first data object type includes an association of the first data object type with a sequence of header information, and wherein the model relating to the first data object type is trained via a machine learning algorithm.

4. The device of claim 1, wherein the solid-state memory device stores the extracted first data object, organizes the extracted first data object, schedules delivery of the extracted first data object, or any combination thereof.

5. The device of claim 1, wherein the graphical processing unit performs graphical functions associated with the extracted first data object.

6. The device of claim 1, wherein the packet monitoring function analyzes at least a portion of payload information associated with the first data object, identifies metadata information associated with the first data object, determines the first data object type associated with the first data object, or any combination thereof.

7. The device of claim 1, wherein the intelligent router stores the extracted first data object as a cached first data object.

8. The device of claim 1, wherein the transmitting the extracted first data object comprises transmitting the extracted first data object from the intelligent router to the client device.

9. The device of claim 1, wherein the request from the client device for the first data object comprises a function of an application programming interface.

10. A non-transitory machine-readable medium, comprising executable instructions that, when executed by a processing system including a processor, facilitate performance of operations, the operations comprising:
    monitoring a plurality of data packets in a data pipeline of a network, wherein the monitoring includes analyzing header information associated with the plurality of data packets to detect one or more indicators associated with a first data object type, wherein the one or more indicators associated with the first data object type include metadata;
    identifying a first data object in the plurality of data packets according to the monitoring of the plurality of data packets and according to a model relating to the first data object type, wherein the model is trained based on associations between data objects of the first data object type and analyzed header information associated with other data packets, wherein the identifying the first data object in the plurality of data packets further comprises identifying metadata associated with the first data object;
    instantiating an intelligent router at the data pipeline of the network responsive to the identifying the first data object, wherein the intelligent router includes a solid-state memory device, a graphical processing unit, and a packet monitoring function;
    switching a first set of data packets of the plurality of data packets associated with the first data object to the intelligent router for extracting the first data object from the first set of data packets to generate an extracted first data object responsive to the identifying the first data object in the plurality of data packets, wherein operation of the intelligent router is directed according to extended tables associated with a domain-specific programming language;
    receiving a request from a client device for the first data object;
    transmitting the extracted first data object to the client device via the data pipeline of the network responsive to the request for the first data object; and
    decommissioning the intelligent router responsive to the transmitting the extracted first data object.

11. The non-transitory machine-readable medium of claim 10, wherein the model relating to the first data object type is trained via a machine learning algorithm.

12. The non-transitory machine-readable medium of claim 10, wherein the solid-state memory device stores the extracted first data object, organizes the extracted first data object, schedules delivery of the extracted first data object, or any combination thereof.

13. The non-transitory machine-readable medium of claim 10, wherein the graphical processing unit performs graphical functions associated with the extracted first data object.

14. The non-transitory machine-readable medium of claim 10, wherein the packet monitoring function analyzes at least a portion of payload information associated with the first data object, identifies metadata information associated with the first data object, determines the first data object type associated with the first data object, or any combination thereof.

15. The non-transitory machine-readable medium of claim 10, wherein the intelligent router stores the extracted first data object as a cached first data object.

16. The non-transitory machine-readable medium of claim 10, wherein the transmitting the extracted first data object comprises transmitting the extracted first data object from the intelligent router to the client device.

17. The non-transitory machine-readable medium of claim 10, wherein the request from the client device for the first data object comprises a function of an application programming interface.

18. A method, comprising:
    monitoring, by a processing system including a processor, a plurality of data packets in a data pipeline of a network, wherein the monitoring includes analyzing header information associated with the plurality of data packets to detect one or more indicators associated with a first data object type, wherein the one or more indicators associated with the first data object type include metadata;
    identifying, by the processing system, a first data object in the plurality of data packets according to the monitoring of the plurality of data packets and according to a model relating to the first data object type, wherein the model is trained based on associations between data objects of the first data object type and analyzed header information associated with other data packets, wherein the identifying the first data object in the plurality of data packets further comprises identifying metadata associated with the first data object;
    instantiating, by the processing system, an intelligent router at the data pipeline of the network responsive to the identifying the first data object, wherein the intelligent router includes a solid-state memory device, a graphical processing unit, and a packet monitoring function;
    switching, by the processing system, a first set of data packets of the plurality of data packets associated with the first data object to the intelligent router for extracting the first data object from the first set of data packets to generate an extracted first data object responsive to the identifying the first data object in the plurality of data packets, wherein operation of the intelligent router is directed according to extended tables associated with a domain-specific programming language;
    receiving, by the processing system, a request from a client device for the first data object;
    transmitting, by the processing system, the extracted first data object to the client device via the data pipeline of the network responsive to the request for the first data object; and
    decommissioning, by the processing system, the intelligent router responsive to the transmitting the extracted first data object.

19. The method of claim 18, wherein the intelligent router stores the extracted first data object as a cached first data object.

20. The method of claim 18, wherein the transmitting the extracted first data object comprises transmitting the extracted first data object from the intelligent router to the client device.

\* \* \* \* \*